July 30, 1929.  L. DE FOREST  1,722,280
PHOTO ELECTRIC CELL
Filed Jan. 29, 1927
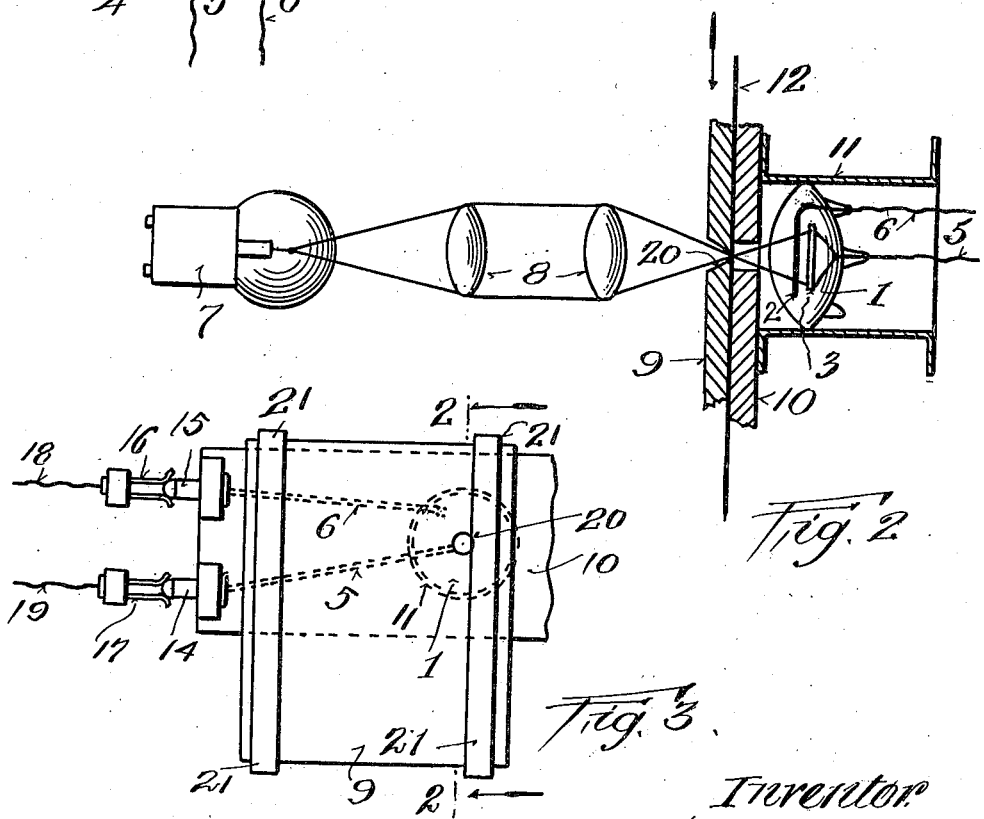
Inventor
Lee DeForest
By his Attorneys Darby & Darby.

Patented July 30, 1929.

1,722,280

UNITED STATES PATENT OFFICE.

LEE DE FOREST, OF NEW YORK, N. Y., ASSIGNOR, BY MESNE ASSIGNMENTS, TO GENERAL TALKING PICTURES CORPORATION, A CORPORATION OF DELAWARE.

PHOTO-ELECTRIC CELL.

Application filed January 29, 1927. Serial No. 164,583.

This invention relates to improvements in photo electric cells and methods of mounting and using the same.

One of the objects of this invention is the novel construction of a photo electric cell to permit location of the active elements thereof close to the walls of the envelope.

A still further object of this invention is an improved photo electric cell construction for use in connection with talking motion pictures, with the parts so arranged, that the electrodes of the cell may be located in proximity to the light slit.

A further object of this invention is the construction of a photo electric cell adapted to give improved quality of reproduction of sound.

A still further object of this invention is to provide an improved phonofilm attachment including the combination with a slit plate and backing plate, of a novel form of photo electric cell which permits the location of the electrodes close to the light slit.

These and several other objects are successfully secured by means of this invention.

This invention resides substantially in the combination, construction, arrangement and relative location of parts, as will appear from the following disclosure.

Referring to the drawings in which the same reference numerals will be used when possible to indicate the same or similar parts, Fig. 1 is a top plan view of my improved photo electric cell construction.

Fig. 1ª is a side elevational view of the cell.

Fig. 2 is a more or less diagrammatic view with some parts in cross section showing the association of the photo electric cell with the light slit and film. The cross sectional view is taken on the line 2—2 of Fig. 3, and Fig. 3 is a side elevational view of a photo electric cell of my novel construction associated with the split plate and backing plate.

In phonofilm work, in reproducing sound from a phonographic record on a celluloid film, I have found it advantageous to locate the photo electric cell as near as possible to the film sound record, so that the path of light from the sound record to the sensitive element of the photo electric cell shall be as short as possible. I have also found that by locating the sensitive surface of the photo electric cell close to the film I gain in efficiency by reducing the loss in the light beam and by centering the light image in as small a space as possible upon the sensitive mirror surface of the photo electric cell.

I further find by so doing I greatly increase the apparent sensitivity of the cell and enhance the overall efficiency of the light and photo electric cell combination. As a result of this arrangement of parts, I also find that the quality of reproduction is greatly improved.

In previously filed patent applications and in issued patents on method and apparatus for reproducing sound from photographically recorded sound records, I shown arrangements similar to those disclosed in this application, but they do not provide an arrangement and a photo electric cell whereby the active electrode thereof may be located very close to the moving film.

Referring to Fig. 1, there is shown a photo electric cell comprising a suitable envelope 1, made for instance of glass, quarts, and the like. Within the envelope is an electrode made up of a wire loop 2 having a lead in wire 6. At 3 is shown the sensitive mirror surface electrode 3, which has the lead in wire 5. At 4 is shown the tip at which the envelope is sealed off after it has been cleaned of gases, after the introduction of a suitable gas and subsequent exhaustion thereof. The particular form of the envelope is clearly shown in Fig. 1ª, and is lenticular in shape. By properly dimensioning this vessel, it is possible to bring the electrodes up very close to the front wall or window of the vessel, so that when the cell is placed very close to the film a light path of minimum length is secured.

In actual construction, it is highly advantageous to make this cell very small and the actual form of cell as I use it is somewhat smaller than the actual cell shown in Figures 1 and 1ª. The sensitive mirror of this cell is secured by deposition on a circular metal plate. This comprises the cathode of the cell, while the wire loop is the anode. This arrangement as described and shown gives me a small lenticular and shallow unit form of photo electric cell, which can be directly introduced into the tubular support mounted at the rear of the film backing plate, as will be described later.

In Figures 2 and 3, I have disclosed methods of associating this cell with the film apparatus. At 7 is shown a constant light source, the rays of which are transmitted through the condensing lenses 8, so as to be focussed on the light slit in the slit plate 9. At 10 is shown the backing plate which forms with the slit plate 9, a guide for the moving film 12 on which the photographic sound record has been made. Mounted on the backing plate is a tubular member 11 within which is mounted the improved form of photo electric cell devised by me. It may be noted that the dimensions of the cell as given in Figure 2, more nearly approximate the actual device, as I use it. All previous forms of photo electric cells have usually been in spherical form, of one or two inches in diameter, or of a cylindrical form, both of which are ill adapted from a practical viewpoint to be permanently located close to the film.

In my copending patent application, Ser. No. 121,679, filed July 10, 1926, I have shown and described a form of film gate construction for phonofilm work, wherein the photo electric cell is located at a distance of at least two or more inches from the film. In this and similar practical arrangements of the film gate and backing plate it has been necessary or highly advantageous to remove the backing plate from time to time in order to readily thread the film into the device or to clean off the dirt and cake emulsion, which gradually accumulates thereon.

This arrangement rendered it impossible to place the heretofore used types of photo electric cells close to the film, and therefore, impossible to take advantage of the fact, which I have discovered here, of locating the photo electric cell close to the slit and film.

After the cell has been located within the tubular member 11 in its proper place it may be permanently secured therein by pouring around it molded paraffine or soft plaster of Paris. Thereafter, the cell, the supporting tube, and the block are integral. By this arrangement, I find a great reduction or entire elimination of the microphonic noises, which are frequently set up in the operation of the phonofilm apparatus in connection with motion picture projectures due to mechanical vibrations of the photo electric cell in its holder, relative to the beam of light which is passing through the film. In view of the extremely small dimensions, of the cell devised by me the anode ring being supported by a short piece of wire within the cell has very little tendency to vibrate with consequent diminution of the microphonic noises, which the vibration of the anode with respect to the cathode or with the beam of light falling on the cathode would produce.

In order to provide means for readily connecting and disconnecting the cell, the leads 5 and 6, shielded, if desired, may be connected to terminal blocks mounted permanently at 14 and 15, respectively. These blocks or contacts are so arranged, that when the backing plate is slipped into place in the reproducing mechanism, contact is made between these blocks and suitable jacks 16 and 17, which are connected by the leads 18 and 19, respectively, to the audion amplifier usually used in said arrangements. At 21 are shown the usual springs which are used in such devices for bracing the backing plate against the film.

As a practical consideration, I may point out that I am able to permanently locate the sensitive mirror surface of the photo electric cell as close as one-fourth to one-half inch to the film, thus achieving the many advantages which I have pointed out above.

I am aware that many changes in the details of construction and relative arrangement of parts will readily suggest themselves to those skilled in this art, and I do not, therefore, desire to be limited to the exact constructions shown for the purpose of illustrating my invention, but rather to the scope of my invention as defined in the appended claims.

What I seek to secure by United States Letters Patent is as follows:

I claim:

A phonofilm attachment comprising a slit block, a backing plate, means for pressing them together, a small photo-electric cell of lenticular shape permanently attached to said backing plate having its cathode close to said slit by reason of its lenticular shape and terminal posts for said cell.

In testimony whereof I have hereunto set my hand on this 25th day of January, A. D. 1927.

LEE DE FOREST.